United States Patent [19]

Calvert

[11] 4,163,649

[45] Aug. 7, 1979

[54] COLLECTION OF FINE PARTICLES FROM A GAS STREAM BY MOVING THE GAS STREAM UPWARD THROUGH A SHALLOW BED OF SOLID GRANULES

[75] Inventor: Seymour Calvert, San Diego, Calif.

[73] Assignee: A.P.T., Inc., San Diego, Calif.

[21] Appl. No.: 857,441

[22] Filed: Dec. 15, 1977

[51] Int. Cl.² .................................... B01D 46/32
[52] U.S. Cl. .................................... 55/99; 55/474; 55/485; 55/512
[58] Field of Search .................. 55/79, 98, 99, 390, 55/474, 479, 485, 512, 518, 77; 23/288 D, 288 E, 288 G

[56] References Cited

U.S. PATENT DOCUMENTS

| | | | |
|---|---|---|---|
| 2,127,645 | 4/1938 | Kinney et al. | 261/94 |
| 2,270,903 | 1/1942 | Rudbach | 55/79 |
| 2,416,165 | 2/1947 | Evans | 23/288 G |
| 2,639,973 | 5/1953 | Fritz | 55/77 |
| 2,664,967 | 1/1954 | Molstedt | 55/79 |
| 2,689,973 | 9/1954 | Lee et al. | 18/1 |
| 2,780,310 | 2/1957 | Schaub | 55/79 |
| 2,834,119 | 5/1958 | Schaub | 55/79 |
| 3,198,729 | 8/1965 | Payne | 23/288 G |
| 3,503,184 | 3/1970 | Knapp et al. | 55/77 |
| 4,017,422 | 4/1977 | Gappa | 55/77 |

Primary Examiner—David L. Lacey
Attorney, Agent, or Firm—Spensley, Horn & Lubitz

[57] ABSTRACT

A method and system for collecting fine particles from a gas stream is disclosed. A shallow dense mobile bed of solid collector granules is moved over a plate containing a plurality of perforations; and a gas stream containing fine particles is moved upward through the perforations to form high velocity gas jets moving upward through the granule bed for causing the collector granules to collect the fine particles from the gas stream by inertial impaction and interception. The bed is only deep enough in relation to the velocity of the gas jets to prevent the gas jets from penetrating the bed without the fine particles therein being collected by the granules. The granule bed is not more than approximately one inch deep. Preferably the granules are moved over a plurality of perforated plates that are positioned in tandem vertically, and the gas stream is moved successively through the perforations in the plurality of plates and thereby through the granules that are moving across the plurality of plates.

6 Claims, 6 Drawing Figures

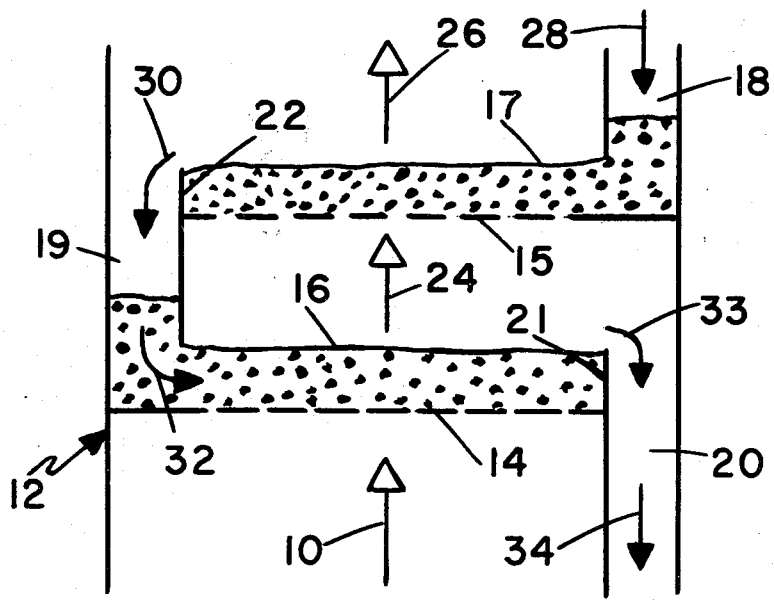

AEROSOL GENERATOR — DRYING — CHARGE NEUTRALIZATION — PARTICLE COUNTER

Fig. 6

THEORY: IMPACTION FROM A ROUND JET.

THEORY: IMPACTION ON SINGLE SPHERES.

COLLECTION EFFICIENCY, %

PARTICLE DIAM. MICROMETERS

COLLECTION OF FINE PARTICLES FROM A GAS STREAM BY MOVING THE GAS STREAM UPWARD THROUGH A SHALLOW BED OF SOLID GRANULES

BACKGROUND OF THE INVENTION

The present invention generally pertains to the collection of fine particles from a gas stream and is particularly directed to a fine particle collection method and system wherein the gas stream is moved through a shallow bed of solid granules.

Two prior art particle collection systems that are related to the present invention are perforated plate wet scrubbers and fluidized beds of solid collector granules.

The collection of fine particles from gas streams by means of perforated (sieve) plate wet scrubbers is well known. Gas flows generally upward through the perforations in the sieve plate and thence through a layer of agitated liquid (foam or froth) and up through another plate or out of the scrubber. Fine particle collection efficiency is known to occur by inertial impaction and interception and can be augmented by the use of other forces which tend to cause particle separation from the gas phase.

During the formation of bubbles on a sieve plate, contact between gas and liquid phases is due to the jets of gas emerging from the perforations and impacting on the liquid. Particles are thus deposited on the liquid surface by inertial impaction. Particle collection can be predicted from the following equation, which is based on experimental data:

$$Pt_d = \exp\left(-\frac{40 \, F^2 d_p^2 \rho_p C' u_h}{9 \, \mu_G d_h}\right)$$

where
- F = foam density, fraction of volume that is liquid
- $d_p$ = particle diameter, cm
- $\rho_p$ = particle density, g/cm$^3$
- $C'$ = Cunningham slip correction factor
- $u_h$ = gas velocity in the perforation, cm/s
- $\mu_G$ = gas viscosity, Poises
- $d_h$ = diameter of perforation, cm
- $Pt_d$ = penetration of particles of diameter $d_p$, for collection during bubble formation Perforated plate wet scrubbers have several disadvantages including the following. The scrubber liquid and solutions which are formed in the scrubber cause corrosion. Solids deposit and adhere to the plates due to mechanisms which act in the presence of water. A relatively high minimum liquid to-gas ratio is required to maintain the necessary foam height on the plate. Gas absorption occurs whether one wants it or not. This can be undesirable in applications such as the cleaning of power plant flue gas from the combustion of low sulfur coal, when particle collection is desired but the gas absorption is not. The operating temperature is limited by the vapor pressure of the scrubber liquid. Liquid waste treatment and/or disposal can be difficult and expensive. When liquid particles are being collected the particulate liquid will be diluted by the scrubber liquid.

Fluidized beds of solid collector granules, including spouted fluidized beds, have been used to collect fine particles from gas streams. These also have several disadvantages as follows: Prior art fluidized beds rely on particle collection throughout a deep bed with comparatively low gas velocities relative to the bed granules. High gas-phase pressure drop is required to maintain fluidization in a deep bed. Deep fluidized beds involve violent circulation of the bed granules and consequent attrition and therefore reentrainment of fine particles which have been collected. There is also some attrition of the bed granules themselves and the formation of fine particles. Deep fluidized beds involve a large inventory (holdup) of bed granules. This can have undesirable consequences in terms of cost, heat requirements, start-up characteristics, etc. Deep fluidized beds require larger equipment volume and larger static and dynamic loadings due to the mass of solids. Consequently, the equipment must be more massive and therefore more expensive.

SUMMARY OF THE INVENTION

The present invention provides an improved method and system for collecting fine particles from a gas stream. In accordance with the present invention, a shallow dense mobile bed of solid collector granules is moved over a plate containing a plurality of perforations; and the gas stream containing fine particles is moved upward through the granule bed for causing the collector granules to collect the fine particles from the gas stream by inertial impaction and interception. Such fine particle collection possibly may be augmented by such other forces as electrostatic, diffusiophoretic and thermophoretic forces. The bed is only deep enough in relation to the velocity of the gas jets to prevent the gas jets from penetrating the bed without the fine particles therein being collected by the granules. Accordingly, the granules bed is not more than approximately one inch deep. Preferably, the granules are moved over a plurality of perforated plates that are positioned in tandem vertically, and the gas stream is moved successively through the perforations in the plurality of plates and thereby through the granules that are moving across the plurality of plates.

There is a generally upward and outward flow of the gas stream, and a cross-flow or radial flow of the granules. The granules may be introduced through inlet pipes which can lead to the side or middle of the plates. The plates are held in a vessel in such a way that the gas must flow up through the perforations.

The granules move off of the plates by overflowing into exit pipes because of the gradual motion of the bed when the gas jet velocities are in the low operating range. Alternatively, the granules may be entrained and cast out of the bed and into the overflow opening of the exit pipes when higher gas velocities are used. Additional means such as vibration or raking the granules can be used also to moved granules out of the beds. The granules may move in a generally countercurrent direction to the gas flow; i.e., going downward from plate to plate. They may alternatively move across individual plates and thence out of the vessel.

The plates may be positioned either horizontal or sloping at an angle from horizontal that is less than the angle of repose of the granules. In the case where sloping beds are used, the bed granule movement will be motivated by gravitational force in addition to other mechanisms which have been mentioned previously.

The perforations may be round or rectangular or triangular in shape and may be sharp edged or in an elongated form, such as might be caused by punching perforation holes in the plates. The minor dimension of the individual perforation holes may be sized such in relation to the major dimension of the individual granules that drainage of the bed granules (weeping) is prevented when the gas flow is decreased or stopped. However, in some applications it is preferable to use smaller granules which would enable more fine particle-to-collector granule contact, even though some weeping would occur. In this embodiment the granules would not be moved across the perforated plate until immediately prior to the initiation of gas flow.

Perforations that are partially covered by a projecting tab also can be used. The projecting tab forms a partial roof over the perforation to prevent weeping. The tab also direct the gas jets to one side or radially outward in all directions, depending on the configuration of the tabs. The use of projection tabs over the perforations thus provides the additional advantage of causing granule flow in a desired direction toward an overflow weir of a perforated plate and into a granule outlet pipe.

After the collector granules are used for fine particle collection, they can be cleaned and recycled, or they can be discarded.

BRIEF DESCRIPTION OF THE DRAWING

FIG. 1 is a schematic diagram illustrating one preferred embodiment of the present invention.

FIG. 2 is a schematic diagram illustrating an alternative preferred embodiment of the present invention.

FIG. 3 is a schematic diagram illustrating an another preferred embodiment of the present invention.

FIG. 4 is a sectional view of a portion of a perforated plate used in one alternative preferred embodiment of the present invention.

FIG. 5 is a schematic diagram illustrating still another preferred embodiment of the present invention as a part of a system for testing its collection efficiency.

FIG. 6 is a graph showing the results of a test conducted to demonstrate collection efficiency using the system of FIG. 5.

DESCRIPTION OF THE PREFERRED EMBODIMENT

Referring to FIG. 1, a gas stream 10 containing fine particles is moved upward within a vessel 12. The vessel 12 includes perforated sieve plates 14 and 15, positioned in tandem vertically. Although two plates 14 and 15 are shown, additional plates may also be positioned in vertical tandem with plates 14 and 15, depending upon the collection efficiency required and the power available. The plates supports beds of collector granules 16 and 17. Alternatively, only one sieve plate will be sufficient for some applications.

The vessel 12 further includes downcomer pipes 18, 19 and 20 for directing collector granules onto and away from the plates 14 and 15.

The vessel 12 also includes an overflow weir 21, 22 at the edge of each plate 14, 15. The weirs 21, 22 define a minimum depth at which the particles are maintained over the breadth of the plates 14, 15.

The vessel 12 additionally contains other inlet and outlet pipes (not shown) for enabling both the gas stream and the granules to enter and leave the vessel 12 and flow as desired through the vessel 12.

The gas stream 10 containing fine particles moves upward through the perforations in the plate 14 to form high velocity gas jets moving upward through the granule bed 16 for causing the collector granules to collect the fine particles from the gas stream by inertial impaction and interception. A partially cleaned gas stream 24 continues to move upward through the perforations of the next plate 15 and through the granule bed 17 on plate 15. A further cleaned gas stream 26 continues to flow upward either through another plate (not shown) or out of the vessel 12.

Granules are provided through the downcomer pipe 18 as illustrated by arrow 28 and flow onto and move across the plate 15 and thence over the overflow weir 22 into the downcomer pipe 19, which conveys the granules as illustrated by arrow 30 onto the plate 14. The granules flow across the plate 14 as indicated by arrow 32 in a similar manner and exit over the weir 21 as indicated by arrow 33 to form a stream indicated by arrow 34 through the downcomer pipe 20.

The gas jets impinging on the bed granules cause a localized fluidization or partial fluidization of the granules because the drag force in an upward direction opposes the gravitational force on the granules. When extremely high jet velocities are used the granules may be elutriated and ejected into the space above the jet. The ejected granules then fall out either on a quiescent region of the bed 16, 17 or into the overflow opening of the downcomer pipe 19, 20. In any event, the action of the gas jets is to cause at least some movement of the bed 16, 17 and this, in turn, imparts sufficient mobility to the bed 16, 17 so that the granules can gradually flow from the granule inlet pipe 18 to the granule outlet pipe 20 via the downcomer 19.

FIG. 2 illustrates a vessel 38 in which perforated sieve plates 41, 42 are sloped at an angle from the horizontal. The sieve plates 41, 42 are positioned at an angle to the horizontal which is less than the angle of repose of the granules in the beds 43, 44. The granules in the sloping beds 43, 44 are caused by gravitational force to flow from the granule inlet pipes 46, 47 over weirs 48 and 49 to the granule outlet pipes 50 and 51. In this embodiment with sloping plates 41, 42 the gravitational force augments the bed mobilization action of the impinging gas jets. FIG. 2 also illustrates a granule cross-flow arrangement in which granules 52, 53 flow onto, across and off of each individual plate 41, 42 in separate steams 55 and 56. The dirty gas stream 58 flows upward through the plate 42 and the bed 44 to emerge as a partially cleaned gas stream 59, which in turn flows upward through the plate 41 and the bed 43 to emerge as a further cleaned stream 60.

FIG. 3 illustrates a granule countercurrent flow embodiment in a vessel 61 containing sloping plates. In this embodiment the granules 62 flow from one plate 63 to the plate 64 through a downcomer pipe 65 as shown in FIG. 3. In other respects, the FIG. 3 embodiment is the same as the FIG. 2 embodiment.

The dimensions and exact configuration of the system of the present invention depend upon the collection efficiency and other operating characteristics desired. The bed granule size can vary over a wide range up to 3 mm diameter. The diameter of the perforations in the plate is chosen depending upon the collection efficiency desired. The diameter is also dependent upon the granule sweeping characteristics desired. The gas jet velocity through the perforations also is determined by the collection efficiency and other operating characteristics desired.

The combination of perforation diameter and gas jet velocity required to provide a given fine particle collection efficiency and any other specific characteristics can be predicted by means of two mathematical models. One model is for inertial deposition on a bed of spheres, based on the theory and experimental data for collection by spheres as presented by N. A. Fuchs in *The Mechanics of Aerosols,* P. 170, Pergamon Press, New York, 1974. The other model is for inertial impaction from round and rectangular jets as presented by T. T. Mercer in *Aerosol Technology in Hazard Evaluation,* p. 46, Academic Press, N. Y. and London, 1973. The perforation area open for flow on each plate should range between 1 and 10% of the total plate area.

A perforated sieve plate 70 including projecting tabs 72 is illustrated in FIG. 4. The tabs 72 cover the perforations 74 in the plate 70 is prevent granules from weeping through the perforations and also direct the flow of the gas jets flowing through the perforations 74 in the direction 76, for causing granules to move across the plate 70 in the general direction 78.

EXAMPLE

The following example demonstrates the efficiency of this invention for removing fine particles from gas streams. Referring to FIG. 5, monodisperse (uniform diameter) latex aerosol particles were introduced from an aerosol generator 70 into a gas stream 72. Aerosol particle diameters from 0.3 to 2.0 micrometers were tested. The total flow rate in the gas stream 72 was approximately 28 liters per minute. The gas stream 72 containing the aerosol then was passed through a drying section 74 and a charge neutralization section 76 before entering a test chamber 78. With valve 80 open and valve 82 closed, the gas stream was passed through a particle collection system 84 which included a perforated sieve plate 86. Each perforation in the plate 86 was approximately one millimeter in diameter. The gas stream passed through the perforations and impinged on a thin bed of 500 micrometer diameter granules 88 which were continuously replenished from a granule reservoir 90 through a dipleg 92 in order to maintain the bed of granules at a constant depth of approximately one quarter of an inch (6.35 millimeters). The partially cleaned gas stream left the test chamber 78 through an outlet sampling line 94. The concentration of aerosol particles in the outlet line 94 was measured by using an optical particle counter 96. By closing the valve 80 and opening the valve 82 an inlet sampling line 98 is used for measuring the concentration of aerosol particles entering the test section using the optical particle counter 96.

The inlet and outlet particle concentrations were used to determine the collection efficiency of the model. The results are shown in FIG. 6. The solid curves in FIG. 6 are theoretical predictions based on the assumptions of collection from a round jet impinging on a flat plate, and a free jet impinging on a single spherical collector, based upon the models taught by Mercer and Fuchs respectively. Referring to FIG. 6, it is seen that the experimental data fall either between or above the curves based upon the two models.

I claim:

1. A method for collecting fine particles from a gas stream by inertial impaction and interception comprising the steps of:
   (a) providing at least one plate having a plurality of perforations therethrough, each said plate having a bed of collector granules disposed over said perforations;
   (b) moving said bed of collector granules across each said plate;
   (c) directing said stream of gas containing said fine particles through said perforations so as to form gas jets; and
   (d) impacting said gas jets on said collector granules, said gas jets having sufficient velocity such that said fine particles are collected by said collector granules by inertial impaction and interception, and said bed of collector granules is only deep enough in relation to the velocity of said gas jets so as to prevent said gas jets from penetrating said bed without said fine particles being collected by said collection granules.

2. A method according to claim 1 wherein the depth of said bed of collector granules is not more than one inch.

3. A method according to claim 2 including the steps of:
   removing said collector granules containing said fine particles from said plate; and
   adding additional collector granules to said plate so as to maintain the depth of said bed.

4. A method according to claim 1 wherein said gas stream is directed through a plurality of said plates which are arranged in a vertical configuration.

5. A method according to claim 1 wherein said bed of collector granules is not more than ¼ inch in depth.

6. A method according to claim 1 wherein the area formed by said plurality of perforations on said plate is between one to ten percent of the total plate area.

* * * * *